US008505487B2

(12) United States Patent
Hoxworth

(10) Patent No.: US 8,505,487 B2
(45) Date of Patent: Aug. 13, 2013

(54) ABSORBENT MATERIAL COMPRISING OF WOOD AND CERTIFIED ORGANIC ALFALFA

(76) Inventor: Kathy Lynn Hoxworth, Milwaukie, OR (US)

( * ) Notice: Subject to any disclaimer, the term of this patent is extended or adjusted under 35 U.S.C. 154(b) by 0 days.

(21) Appl. No.: 13/219,676

(22) Filed: Aug. 28, 2011

(65) Prior Publication Data

US 2013/0047929 A1  Feb. 28, 2013

(51) Int. Cl.
*A01K 1/01* (2006.01)

(52) U.S. Cl.
USPC .......................................... 119/171

(58) Field of Classification Search
USPC ......................... 119/171, 172, 173
See application file for complete search history.

(56) References Cited

U.S. PATENT DOCUMENTS

| | | | |
|---|---|---|---|
| 3,789,797 A | 2/1974 | Brewer | |
| 3,923,005 A | 12/1975 | Fry et al. | |
| 3,941,090 A * | 3/1976 | Fry | 119/171 |
| 4,258,659 A | 3/1981 | Rowell | |
| 4,517,919 A | 5/1985 | Benjamin et al. | |
| 4,625,679 A | 12/1986 | Hill | |
| 5,044,324 A * | 9/1991 | Morgan et al. | 119/171 |
| 5,526,770 A | 6/1996 | Kiebke | |
| 5,884,584 A * | 3/1999 | Feldman | 119/171 |
| 5,964,187 A * | 10/1999 | Willis | 119/171 |
| 6,401,662 B1 * | 6/2002 | Sourek, Jr. | 119/172 |
| 6,435,135 B1 * | 8/2002 | Johnston et al. | 119/171 |
| 6,619,234 B2 * | 9/2003 | Sourek, Jr. | 119/172 |
| 7,124,710 B2 | 10/2006 | Weaver | |
| 7,331,309 B2 | 2/2008 | Burckbuchler, Jr. | |
| 7,757,638 B2 * | 7/2010 | Wang et al. | 119/173 |
| 7,856,946 B2 * | 12/2010 | Burckbuchler, Jr. | 119/171 |
| 7,942,113 B2 | 5/2011 | Chen | |

OTHER PUBLICATIONS

Mackes, French, Lynch, Ward, "The use of White Fir Shavings As Bedding for Laboratory Animals", Colorado State University, pp. 1-14, Jun. 12, 2010.*
Internet Archive Wayback Machine recordation of the article "The Use of White Fir Shavings As Bedding for Laboratory Animals", Jun. 12, 2010. http://wayback.archive.org/web/*/http://csfs.colostate.edu/cowood/library/01_White_Fir_Shavings.pdf.*

* cited by examiner

*Primary Examiner* — Yvonne Abbott

(57) ABSTRACT

Embodiments of absorbent materials are suitable for animal litter and/or soil supplements/fertilizers. In certain embodiments, such absorbent materials may be comprised of approximately 40% pine, approximately 40% white fir, and approximately 20% organic alfalfa, as just an example.

4 Claims, No Drawings

ABSORBENT MATERIAL COMPRISING OF WOOD AND CERTIFIED ORGANIC ALFALFA

BACKGROUND OF THE INVENTION

Previously, it has been known to use white fir particles, chips, shavings, wheat by-product, grain hulls and shafts, corn, corn starch, wheat gluten, silica gel, polysaccharides, plural particles of a grain-based, substrate, ionic salt, plural particles of a seed meal, ground grains, wheat middling, etc. as a litter for animals. These other materials also are processed through multiple stages for pelletizing and using varying ranges of materials without consistency of what is regularly used as their multiple patent codes indicate, see for example, U.S. Pat. Nos. 3,923,005, 4,258,659, 5,884,584, and Worlds Best Cat Litter patents U.S. Pat. Nos. 6,098,569, 6,216,634, 6,405,677, 6,622,658, 6,868,802. These materials have also traditionally been composed/combined with other additives for odor control and other ingredients to create aesthetic properties for the purchaser of the absorbent material to be used as animal litter. To avoid increasing the materials being deposited into landfills, a material is needed that is biodegradable, compostable and capable of adding nutrients back into the soil and improving the soils texture and water retention capabilities of the soil the litter is deposed at.

Also, the process of pelletization of the exampled invention above is complex and thus expensive, exacts a toll on the extruding equipment used for the pelletizing process, by causing greater amounts of wear on the equipment parts, resulting in the expense of frequent maintenance and replacement and then the addition of "other" products for odor control and aesthetic purposes requires the product to go through multiple transformation from its original base product. Also the processes involved to create these other litters may also be harmful to the employees processing the product but due to the short term these litters have been in manufacturing, the long term effects on employees handling the materials/additives may not be known for many years to come. The pelletization process is also harmful to the environment due to the amount of energy used to process through the complexity of sourcing various components used, the blending, mixing and ultimate pelletizing process. Also, the consistency of the raw materials used on a consistent basis, the source of the material used in many of the pelletized litters and the quality of the raw materials used to compose the final pelletized product is undetermined.

The ultimate disposal of litters such as the example above do not reintroduce nutrients and beneficial characteristics to the soil. They do not create sustainability through improved soil texture, water retention and nutrients.

BRIEF SUMMARY OF THE INVENTION

This invention relates generally to the field of absorbent mixtures that can be used as an animal litter and as a soil supplement/fertilizer, and, more particularly, to an absorbent material that includes a mixture of pine wood, white fir wood and certified organic alfalfa. The absorbent material is characterized by a pleasant odor, durability, good absorption, good odor control, lightweight, biodegradable, compostable in approximately 6 to 12 months in residential composters, can be recycled via metro recycling of yard debris systems for composting and is especially suitable for use as a small animal litter, which effectively absorbs animal waste materials and neutralizes associated unpleasant odors, composts easily in current compost bins offered by local governments or local home building supply stores for residential use and local governments large composting facilities. Through composting, the invention also provides nutrients into the soil and can be used solely as a soil supplement/fertilizer due to the characteristics of the pine for improving soil texture, the characteristics of white fir to improve the soil water retention capabilities and the addition of nutrients and natural growth hormones found in certified organic alfalfa to the soil where this invention is disposed.

DETAILED DESCRIPTION OF THE INVENTION

The present invention involves an absorbent material made of a mixture of pine wood, white fir wood and certified organic sundried alfalfa.

It is the object of the present invention to provide an absorbent material which is useful as an animal litter particularly well-suited for household pets, which is simple to prepare, and thus relatively inexpensive, while also being highly absorbent of both liquids and odors, biodegradable, compostable, lightweight and having an aesthetically pleasing natural fragrance and appearance and avoids exposure, to the pet and person, of gluten, starches, sugars, salts, silica, gels and any other unidentified materials in the litter while handling and/or disposing of the litter and also provides improved texture, water retention and nutrients of the soil where this present invention will be disposed of.

The wood of the present invention is debarked pine and debarked white fir from the processing of lumber which was pelletized and then reprocessed with a mixture of pelletized certified organic sundried alfalfa. The amount of pine wood in the absorbent material is from about 10% to 70% by weight, from about 10% to about 70% by weight white fir wood and from about 10% to about 50% by weight certified organic sundried alfalfa. The most preferred range for the pine and white fir is about 50% and the certified organic alfalfa is from about 10% to about 50% by weight depending upon the usage of the absorbent material. This absorbent material was designed for use with animals such as cats, chickens and rabbits and for plants such as orchids, roses, azaleas, rhododendrons.

This particular blend of ingredients has a pleasing natural appearance and pine odor, is light weight, highly absorbent of odors and fluids, biodegradable, compostable. This ability to absorb fluids and odors is particularly high as a relative ratio of fluids and odors per weight unit of the new litter mixture, when compared to known litters. This advantage of the new litter odor control is attainable, in large part, because of the use of certified organic sundried alfalfa and the high natural zeolite content found in alfalfa. Thus, the new litter mixture is more pleasant to have in a home environment for use with pets, particularly when the person caring for the animal happens to be a small child, an elderly person or other individual/s who cannot readily lift heavy containers of known pet litters. The advantage of the new litter in soil supplement is due to the quality of texture pine adds to the soil and the increased water retention white fir provides to the soil and the nutrients found naturally in alfalfa, I.E. Vitamin A, Folic Acid, Thiamin, Riboflavin, Pantothenic Acid, Niacin, Tricontanol (a natural occurring growth hormone found in the organic alfalfa).

It has been discovered that a particular mixture of certain known substances results in a litter which is surprisingly well-suited for use with household pets, such as rabbits, guinea pigs, monkeys, mice, gerbils, birds, hamsters, etc. The presently conceived invention is a mixture of certified organic sundried alfalfa, pine and white fir that provides a safe and effective litter but is also beneficial to the soil where it is ultimately disposed at.

This particular mixture is also well-suited, for example, for pet stores, pet shelters, pet adoption centers, zoological parks, or other displays frequented by many people, some of whom may be especially easily offended by the odor of animal urine or the appearance of soiled cage litter, allergic to gluten (wheat based litters), diabetic (corn based litters), severe allergy concerns (100% pine litters) and silicon dust (which can cause respiratory irritation).

Accordingly, in order to accomplish the above goals, the present invention is, briefly, an absorbent material suitable for use as an animal litter and is beneficial as a soil supplement/fertilizer which is composed of a mixture of (a) from about 10% to about 70% by weight pine wood;
(b) from about 10% to about 70% by weight white fir wood; and
(c) from about 10% to about 50% by weight certified organic sundried alfalfa.

The white fir wood of the present invention is debarked white fir saw dust from the processing of lumber for construction which was pelletized and then reprocessed with a mixture of pine and certified organic sundried alfalfa. The amount of white fir wood in the absorbent material is from about 10% to 70% by weight. The preferred range is from about 10% to about 50% by weight. The most preferred range is from about 15% to about 40% by weight.

The certified organic sundried alfalfa of the present invention was pelletized and then reprocessed with a mixture of white fir and pine. The amount of certified organic sundried alfalfa in the absorbent material is from about 10% to 50% by weight. The preferred range is from about 10% to about 35% by weight. The most preferred range is from about 10% to about 25% by weight.

Pine, white fir and organic certified sundried alfalfa provides a less fertile ground for bacterial growth, thus keeping odors in soiled litter to a minimum due to the natural occurring zeolites found in these natural products. The most preferred size of the particles is 14 to 400 mesh to about 0.25 inches in diameter and no longer than 0.375 inches long.

Therefore, the absorbent material of the present invention is a mixture of the three components; pine, white fir and certified organic sundried alfalfa. No deodorants, perfumes, dyes, oils, chemicals, disinfectants, pesticides or additional absorbent components of any kind are added to the absorbent material.

The following example is provided as an illustration of a typical embodiment of the product of this invention and is not intended in any way to limit the scope of the invention to the specific constraints therein described (all components are by weight):

40 parts of pine—40 parts of white fir—20 parts of certified organic sundried alfalfa pellets.

To use the present invention, user simply opens the improved cat litter from its recyclable packaging and pours a suitable volume thereof within a container fabricated of a material specifically adapted for use as an animal litter storage receptacle.

Such a mixture will give a highly suitable result for use as a litter for household pet animals in absorbency of both liquids and odors, is very light in weight, produces a pleasant natural pine/fir fragrance, is compostable and is biodegradable within 6-12 months.

Therefore, the foregoing description is included to illustrate the operation of the preferred embodiment and of the best mode contemplated, it is not meant to limit the scope of the invention. As one can envision, an individual skilled in the relevant art, in conjunction with the present teachings, would be capable of incorporating many minor modifications that are anticipated within this present invention. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiment was chosen and described in order to best explain the principles of the invention and its practical application, to thereby enable others skilled in the art of pet care to best utilize the invention and various embodiments with various modifications as are suited to the particular use contemplated. As various modifications could be made in the composition herein described, without departing from the scope of the invention, it is intended that all matter contained in the foregoing description shall be interpreted as illustrative rather than limiting. Various other modifications and changes may be made with respect to the foregoing detailed description without departing from the spirit of the present invention. Therefore, the scope of the invention is to be broadly limited only by the following Claims.

What is claimed is:

1. An absorbent material suitable for animal litter comprising: a mixture of pine, white fir and alfalfa.

2. The absorbent material of claim 1, wherein one or more of said pine, said white fir or said alfalfa is pelletized, at least in part.

3. An The absorbent material of claim 1, wherein said at least some of said pine or said white fir is debarked.

4. A composition, comprising:
an at least partially absorbent material, wherein said material comprises approximately 40% pine, approximately 40% white fir, and approximately 20% alfalfa.

* * * * *